(12) United States Patent
Ozawa

(10) Patent No.: US 8,949,479 B2
(45) Date of Patent: Feb. 3, 2015

(54) INFORMATION PROCESSING APPARATUS, CONTROL METHOD FOR THE SAME, AND STORAGE MEDIUM

(71) Applicant: Canon Kabushiki Kaisha, Tokyo (JP)

(72) Inventor: Manabu Ozawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/041,469

(22) Filed: Sep. 30, 2013

(65) Prior Publication Data

US 2014/0095740 A1    Apr. 3, 2014

(30) Foreign Application Priority Data

Oct. 3, 2012    (JP) .................................. 2012-221601

(51) Int. Cl.
  *G06F 3/00*   (2006.01)
  *G06F 11/30*   (2006.01)
(52) U.S. Cl.
  CPC ........... *G06F 11/3034* (2013.01); *Y02B 60/165* (2013.01)
  USPC .......................................................... 710/13

(58) Field of Classification Search
  USPC ............................................................ 710/18
  See application file for complete search history.

(56) References Cited

U.S. PATENT DOCUMENTS

| 8,392,737 B2 * | 3/2013 | Sharma et al. ................. 713/324 |
| 2012/0018885 A1 * | 1/2012 | Lee et al. ....................... 257/738 |

* cited by examiner

*Primary Examiner* — Chun-Kuan Lee
(74) *Attorney, Agent, or Firm* — Carter, DeLuca, Farrell & Schmidt, LLP

(57) ABSTRACT

An information processing apparatus (MFP) according to an aspect of this invention selects, from among memory channel groups composed of possible combinations of available memory channels in a wide IO memory device, a memory channel group with a number of memory channels that can maintain a necessary data transfer rate even if the operation frequency is reduced. At that time, the MFP evaluates the power consumption of the wide IO memory device in the case of using each memory channel group at the operation frequency and operation voltage corresponding to the number of memory channels in the memory channel group and to the transfer rate needed for job execution. As a result of evaluating power consumption, the MFP selects the memory channel group with the lowest power consumption and uses it for job execution.

13 Claims, 10 Drawing Sheets

| TEMPERATURE SENSOR NAME | TEMPERATURE INFORMATION |
|---|---|
| TEMPERATURE SENSOR 309 | 50°C |
| TEMPERATURE SENSOR 310 | 60°C |
| TEMPERATURE SENSOR 311 | 65°C |
| TEMPERATURE SENSOR 312 | 70°C |

FIG. 11

| MODULE NAME | NEEDED BANDWIDTH | NUMBER OF MEMORY CHANNELS USED | OPERATION FREQUENCY | OPERATION VOLTAGE | OPERATION POWER |
|---|---|---|---|---|---|
| PRINTING IMAGE PROCESSING UNIT | 3GB/s | 1 | 260MHz | 1.5V | 390mW |
| | | 2 | 130MHz | 1.4V | 364mW |
| | | 3 | 87MHz | 1.3V | 339mW |
| | | 4 | 65MHz | 1.2V | 312mW |

INFORMATION PROCESSING APPARATUS, CONTROL METHOD FOR THE SAME, AND STORAGE MEDIUM

BACKGROUND OF THE INVENTION

1. Field of the Invention

The present invention relates to an information processing apparatus including a wide IO memory device stacked on an SoC die that includes a CPU.

2. Description of the Related Art

In information processing apparatuses that include a CPU such as a microprocessor, a DRAM is often used for storage of data for executing an OS and various applications, and for temporary storage of data for executing image processing. The DRAM is connected to a CPU, an SoC (System on a Chip), or the like and used by them. Furthermore, in recent years, as functions have been added/enhanced in information processing apparatuses, the amount of memory bandwidth needed in DRAMs has increased. Because of this, the amount of memory bandwidth has been increased by raising the clock frequency during memory access, according to a standard such as DDR3 or DDR4. Furthermore, as another method, memory bandwidth is reserved by including multiple DRAM channels that are connected to a CPU or an ASIC (Application Specific Integrated Circuit). However, a new problem occurs in that increasing the clock frequency and employing multiple memory channels increases power consumption.

In view of this, wide IOs, which are a next-generation DRAM standard, are currently gaining attention. A wide IO is configured by placing a DRAM chip over an SoC die using a 3D stacking technique based on TSVs (Through-Silicon Vias). Features of the wide IO include being able to obtain a wide bandwidth that is over 12.8 GB/s (gigabytes per second) at most, with a wide data width of 512 bits, and having low power consumption due to the access frequency being suppressed to a low frequency. Also, by employing TSVs, the package size can be made thinner and smaller compared to a conventional PoP (Package on Package). Furthermore, as a countermeasure against heat caused by stacking memories in an SoC package, a temperature sensor that detects the memory temperature is built in, and the self-refresh rate is changed according to the detected temperature. Also, in this configuration, a data width of 512 bits is divided into four 128-bit channels and each channel is controlled individually. For example, a method of use is possible in which channel 1 and channel 2 are put in a self-refresh state, while channel 3 and channel 4 are used for normal memory access, or the like. A basic structure and basic access method for such a wide IO is disclosed in US Patent Application Publication No. 2012/0018885.

The stacked structure of a wide IO is structurally susceptible to heat. For example, if a specific region of a SoC die and a DRAM chip of a wide IO placed on a layer above this specific region are activated at the same time, the temperature of the activated portions sometimes rises locally. This rise in temperature is accompanied by an exponential increase in leak current in the semiconductor and an increase in power consumption.

In view of this, the DRAM performs storage of data by storing charge in a capacitor included in each cell. Since the capacitors are naturally discharged by leak current in the semiconductor, it is necessary for the DRAM to charge the capacitors by performing a refresh operation, in order to preserve the stored data. The discharging of this charge depends on the temperature of the DRAM, and the higher the temperature is, the faster the discharge speed is. Accordingly, if the temperature of the DRAM becomes high, the refresh frequency needs to be increased. As a result, this invites an increase in power consumption caused by refresh operations, as well as the deterioration of the access performance of the DRAM due to not being able to access the DRAM during a refresh operation.

Additionally, the amount of heat generated in the circuits is generally proportional to the power consumption of the circuits. If a wide IO DRAM, which is susceptible to heat, is used as a memory device, it is necessary to address increases in power consumption in order to suppress the amount of heat generated in the circuits more than in the case of using another memory device.

In view of this, it is envisioned that power consumption will be further reduced with a wide IO by, using the feature of being able to control memory channels individually, actively controlling the memory channels not only when operating in a power-saving mode, but also when operating in a normal operation mode. For example, control to operate, in standby mode, a wide IO DRAM in a power-saving mode such as a self-refresh mode, and to cause, when the execution of certain processing is needed, only a needed memory channel to return from the power-saving mode is envisioned.

When subjecting a wide IO DRAM to this kind of control, it is necessary to further lower the operation frequency of the DRAM in order to achieve greater power conservation. However, if the operation frequency is simply reduced, there is a problem in that the memory bandwidth decreases and the access performance of the DRAM deteriorates. Due to this deterioration of DRAM access performance, the performance of the system that includes the SoC package deteriorates, and the product performance deteriorates.

SUMMARY OF THE INVENTION

The present invention has been provided in view of the aforementioned problems. One aspect of the present invention provides a technique that enables further reduction of power consumption by further lowering the operation frequency of a memory device without access performance deteriorating in the case where a wide IO memory device is used in an information processing apparatus.

According to one aspect of the present invention, there is provided an information processing apparatus comprising: a wide IO memory device stacked over an SoC die that includes a CPU; a plurality of functional modules configured to each execute a separate function; a specifying unit configured to, upon being instructed to execute a function, specify one or more available memory channels based on a status of use of a plurality of memory channels corresponding to a plurality of memories included in the wide IO memory device; an evaluation unit configured to, for each of a plurality of memory channel groups composed of possible combinations of the memory channels specified by the specifying unit, evaluate power consumption of the wide IO memory device in a case where the memory channel group is used at an operation voltage and an operation frequency that correspond to a number of memory channels in the memory channel group and a data transfer rate needed for execution of the function; and a selection unit configured to select, out of the plurality of memory channel groups, a memory channel group for which power consumption of the wide IO memory device is lowest, as a memory channel group to be used by the functional module corresponding to the function.

According to another aspect of the present invention, there is provided a control method for an information processing apparatus including a wide IO memory device stacked over an SoC die that includes a CPU, the control method comprising steps of: upon instruction of execution of a function by a functional module out of a plurality of functional modules that each execute a separate function, specifying one or more available memory channels based on a status of use of a plurality of memory channels corresponding to a plurality of memories included in the wide IO memory device; for each of a plurality of memory channel groups composed of possible combinations of the memory channels specified by the specifying unit, evaluating power consumption of the wide IO memory device in a case where the memory channel group is used at an operation voltage and an operation frequency that correspond to a number of memory channels in the memory channel group and a data transfer rate needed for execution of the function; and selecting, out of the plurality of memory channel groups, a memory channel group for which power consumption of the wide IO memory device is lowest, as a memory channel group to be used by the functional module corresponding to the function.

According to still another aspect of the present invention, there is provided a computer-readable storage medium storing a computer program for causing a computer to execute steps of a control method for an information processing apparatus including a wide IO memory device stacked over an SoC die that includes a CPU, the control method comprising steps of: upon instruction of execution of a function by a functional module out of a plurality of functional modules that each execute a separate function, specifying one or more available memory channels based on a status of use of a plurality of memory channels corresponding to a plurality of memories included in the wide IO memory device; for each of a plurality of memory channel groups composed of possible combinations of the memory channels specified by the specifying unit, evaluating power consumption of the wide IO memory device in a case where the memory channel group is used at an operation voltage and an operation frequency that correspond to a number of memory channels in the memory channel group and a data transfer rate needed for execution of the function; and selecting, out of the plurality of memory channel groups, a memory channel group for which power consumption of the wide IO memory device is lowest, as a memory channel group to be used by the functional module corresponding to the function.

According to an aspect of the present invention, a technique is provided that enables further reduction of power consumption by further lowering the operation frequency of a memory device without access performance deteriorating in the case where a wide IO memory device is used in an information processing apparatus.

Further features of the present invention will become apparent from the following description of exemplary embodiments (with reference to the attached drawings).

BRIEF DESCRIPTION OF THE DRAWINGS

FIG. 10 is a flowchart showing a procedure of evaluation processing in the case where power consumption is evaluated using the temperature information of memories in steps S806, S808, S809, and S810 (FIG. 8), according to an embodiment of the present invention.

FIG. 11 is a diagram showing an example of a table that is used for evaluating the power consumption of the wide IO memory device, according to an embodiment of the present invention.

DESCRIPTION OF THE EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

An MFP (digital multi-function device) having multiple functions such as scanning, printing, and copying will be described in the embodiments below as an example of an information processing apparatus to which the present invention applies.

<Configuration of MFP 100>

Figure 1:
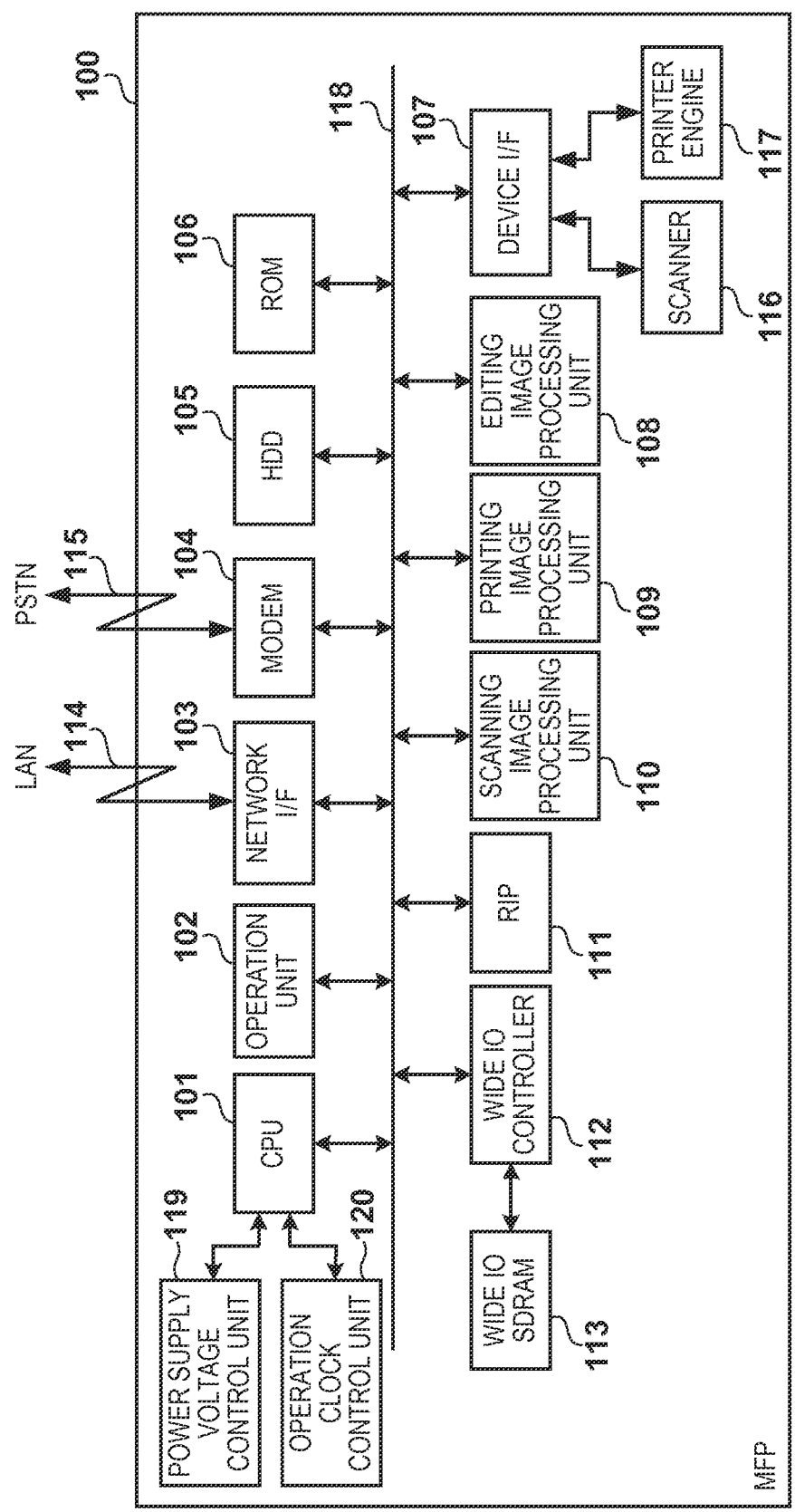
FIG. 1 is a block diagram showing an overall configuration of an MFP (a digital multifunction device) according to an embodiment of the present invention.

FIG. 1 is a block diagram showing an overall configuration of an MFP (a digital multi-function device) according to the present embodiment.

An MFP 100 has a scanner 116 that is an image input device, and a printer engine 117 that is an image output device, and these are connected to a system bus 118 via a device interface (I/F) 107. The MFP 100 can perform scanning of an original image using the scanner 116, and printing using the printer engine 117, under control of the CPU 101. Also, the MFP 100 is connected to a LAN 114 and a public switched telephone network (PSTN) 115, and can input and output image data and device information regarding an external device connected to the LAN or the PSTN via the LAN 114 and the PSTN 115.

A CPU 101 controls the operation of this MFP 100 by executing a program loaded from an HDD 105 to a wide IO SDRAM 113 by a boot program stored in a ROM 106. The CPU 101 performs power control of the MFP 100 via a power supply voltage control unit 119 and controls the supply of the power supply voltage (operation voltage) to the devices in the MFP 100. Also, the CPU 101 performs clock control of the MFP 100 via an operation clock control unit 120, and controls the frequency of clock signals (clock frequency or operation frequency) supplied to the devices in the MFP 100.

An operation unit 102 has an input unit such as a touch panel or a keyboard, and a display unit, and receives instructions from a user, and causes the display unit to display messages, processing results, and the like to the user. The network I/F 103 is realized by a LAN card for example, and performs input/output of device information and image data with external devices via the LAN 114. A modem 104 performs input/output of control information and image data with external devices via the PSTN 115. The HDD (hard disk drive) 105 stores an OS, various application programs, and the like, and holds input image data and the like. The ROM 106 stores a boot program and various data. The device I/F 107 is connected to the printer engine 117 and the scanner 116, and performs processing for image data transmission with the scanner 116, the printer engine 117, and the system bus 118.

As shown in FIG. 1, the MFP 100 includes image processing units 108 to 111 (an editing image processing unit 108, a printing image processing unit 109, a scanning image processing unit 110, and a RIP (Raster Image Processor) 111) for executing respective image processing functions. The editing image processing unit 108 performs, on image data, various types of image processing, such as rotation and size adjustment, color processing, trimming/masking, binary conversion, multi-value conversion, and blank sheet determination. The printing image processing unit 109 performs image processing and the like that corresponds to the printer engine 117 on image data to be output to the printer engine 117. The scanning image processing unit 110 performs various types of processing such as correcting, manipulating, and editing on image data input from the scanner 116. The RIP 111 renders page description language (PDL) code into image data. Note that in the present embodiment, the image processing units 108 to 111 are one example of multiple functional modules that each execute a separate function.

A wide IO controller 112 converts memory access commands from the CPU 101, the image processing units 108 to 110, and the like into commands that are interpretable by the wide IO SDRAM 113 and accesses the wide IO SDRAM 113. The wide IO SDRAM 113 stores programs to be executed by the CPU 101, and provides a system working memory for the CPU 101 to operate. Additionally, the wide IO-SDRAM 113 is also an image memory for temporarily storing input image data. As shown in FIG. 1, the system bus 118 connects the aforementioned devices and the CPU 101, and transfers control signals, data, and the like therebetween.

The power supply voltage control unit 119 controls the power supply voltage to be supplied to the devices in the MFP 100. Although the power supply voltage to be supplied to the devices is decided on in advance during the designing of the MFP 100, it is possible to change it while the MFP 100 is operating by the CPU 101 giving a power supply voltage change command to the power supply voltage control unit 119. The operation clock control unit 120 controls clock signals that are supplied to the devices in the MFP 100. Although the clock frequency of clock signals to be supplied to the devices is decided on in advance during the designing of the MFP 100, it is possible to change it while the MFP 100 is operating by the CPU 101 giving a clock frequency change command to the operation clock control unit 120.

<Structure of Wide IO SDRAM 113>

Figure 2A:
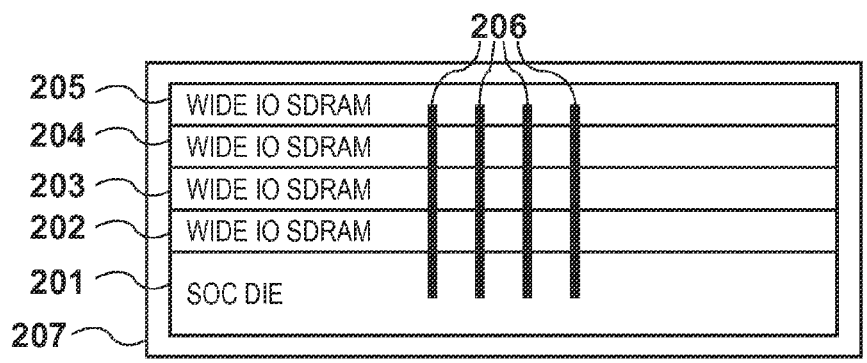
FIGS. 2A and 2B are pattern diagrams showing the structure of a wide IO SDRAM according to an embodiment of the present invention.
Figure 2B:
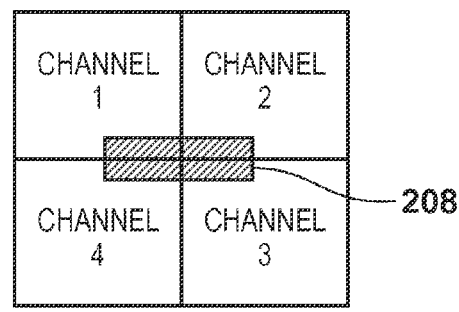

FIGS. 2A and 2B are pattern diagrams showing the structure of the wide IO SDRAM 113 according to the present embodiment, FIG. 2A being a side view of the wide IO SDRAM and an SoC die viewed from the side, and FIG. 2B being a top view.

In the present embodiment, an SoC die 201 includes the CPU 101, the device I/F 107, the RIP 111, the image processing units 108 to 110, and the like. Wide IO SDRAM chips 202 to 205 are stacked over the SoC die 201 and connected to the SoC die 201 by a Through-Silicon Via (TSV) 206. The wide IO SDRAM chips can be stacked in four layers at most, according to the necessary memory capacity, and an example of stacking in four layers is shown in FIG. 2A. An SoC package 207 contains the SoC die 201 and the wide IO SDRAM chips 202 to 205 in one package. As shown in FIG. 2B, the wide IO SDRAM I/F 208 is arranged in the central portion of the SoC die 201 and the wide IO SDRAM chips 202 to 205.

<Configuration of Wide IO Controller 112>

Figure 3:
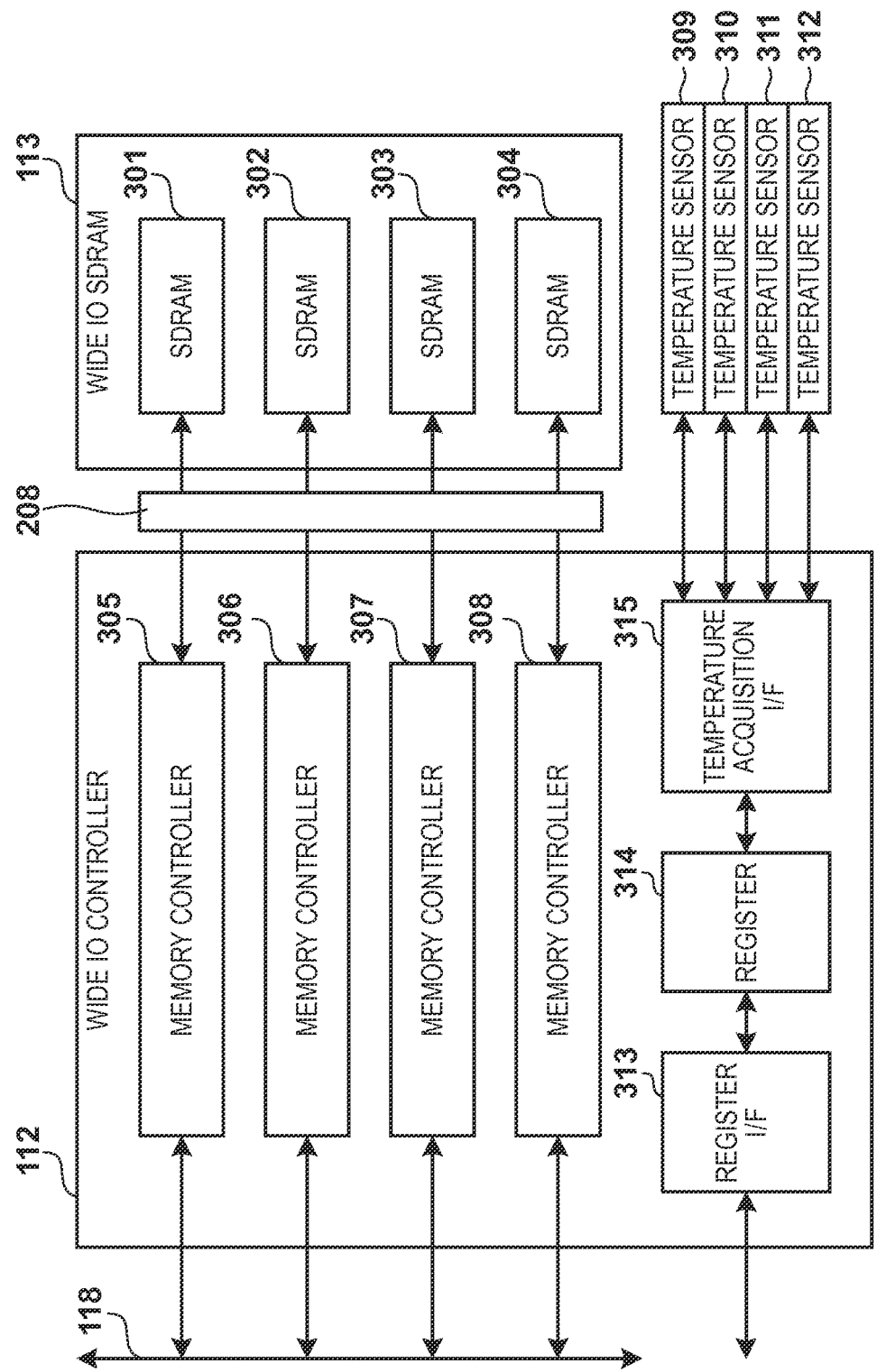
FIG. 3 is a block diagram showing the internal configuration of a wide IO controller according to an embodiment of the present invention.

FIG. 3 is a block diagram showing the internal configuration of the wide IO controller 112 according to the present embodiment.

In FIG. 3, the wide IO controller 112 is connected between the system bus 118 and the wide IO SDRAM 113, as shown in FIG. 1. The wide IO controller 112 is connected to temperature sensors 309 to 312, which are not illustrated in FIG. 1.

SDRAMs 301 to 304 are four memories provided in the wide IO SDRAM 113, and each includes a dedicated interface (I/F) as shown in FIG. 3. The dedicated I/Fs correspond to the four channels of the wide IO SDRAM chips 202 to 205, which are stacked over the SoC die 201 as described above. Also, the dedicated I/Fs correspond to the wide IO SDRAM I/F 208 in FIG. 2B. The memory controllers 305 to 308 can individually control power supply voltage, as well as the supply and termination of clock signals, for the SDRAMs 301 to 304. Each of the memory controllers 305 to 308 accesses a corresponding connected SDRAM by converting a memory access command from the system bus 118 into a command that is interpretable by the SDRAM. Note that the wide IO SDRAM 113 (SDRAMs 301 to 304) is an example of a wide IO memory device stacked over an SoC die that includes a CPU.

The temperature sensors 309 to 312 measure the temperature of the corresponding SDRAM out of the SDRAMs 301 to 304. A temperature acquisition I/F 315 acquires temperature information indicating the temperatures of the SDRAMs 301 to 304 from the temperature sensors 309 to 312.

Figure 4:
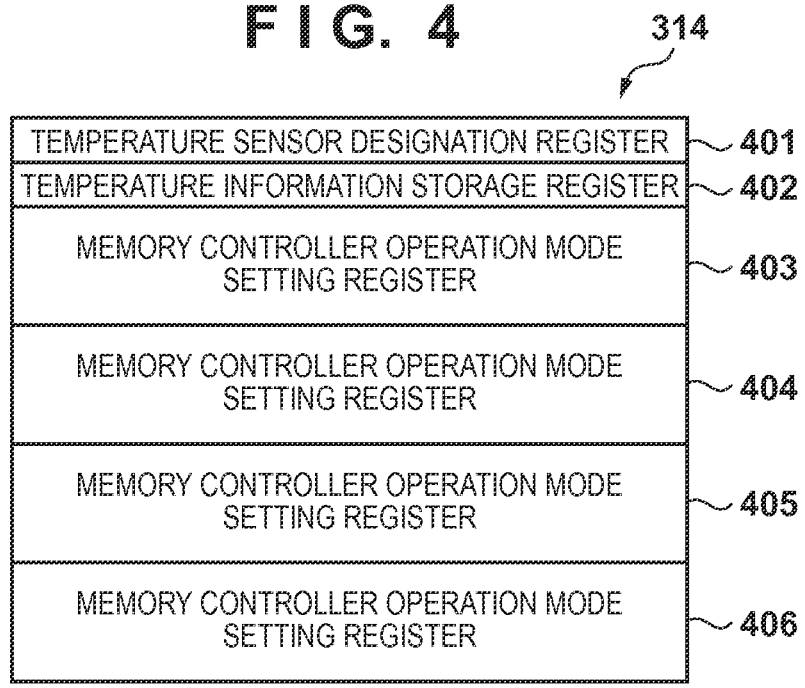
FIG. 4 is a diagram for describing a configuration of a register according to an embodiment of the present invention.

A register I/F 313 receives access from the CPU 101 via a register-dedicated bus (not shown). A register 314 stores temperature information acquired by the temperature acquisition I/F 315 from the temperature sensors 309 to 312, as well as operation mode setting information for the memory controllers 305 to 308, which is set by the CPU 101. If the temperature acquisition I/F 315 detects a temperature information acquisition request from a temperature information storage register 402 (FIG. 4), which will be described later, the temperature acquisition I/F 315 issues a command for acquiring the temperature information to the temperature sensor designated by a later-described temperature sensor designation register 401 (FIG. 4). Thus, the temperature acquisition I/F 315 acquires the temperature information from the corresponding temperature sensor. The temperature acquisition I/F 315 outputs (stores) the acquired temperature information to the temperature information storage register 402 (described later).

<Configuration of Register 314 in Wide IO Controller 112>

FIG. 4 is a diagram for describing the configuration of the register 314 according to the present embodiment.

The register 314 has the temperature sensor designation register 401, the temperature information storage register 402, and memory controller operation mode setting registers 403 to 406. The temperature sensor designation register 401 is a register that stores information for designating a temperature sensor to be the target when the CPU 101 is to acquire the temperature information of a temperature sensor. Since the present embodiment will be described using an example in which four temperature sensors are provided, it can be configured by a two-bit register, and can specify each of the four temperature sensors by the states of the two bits.

Figure 9:
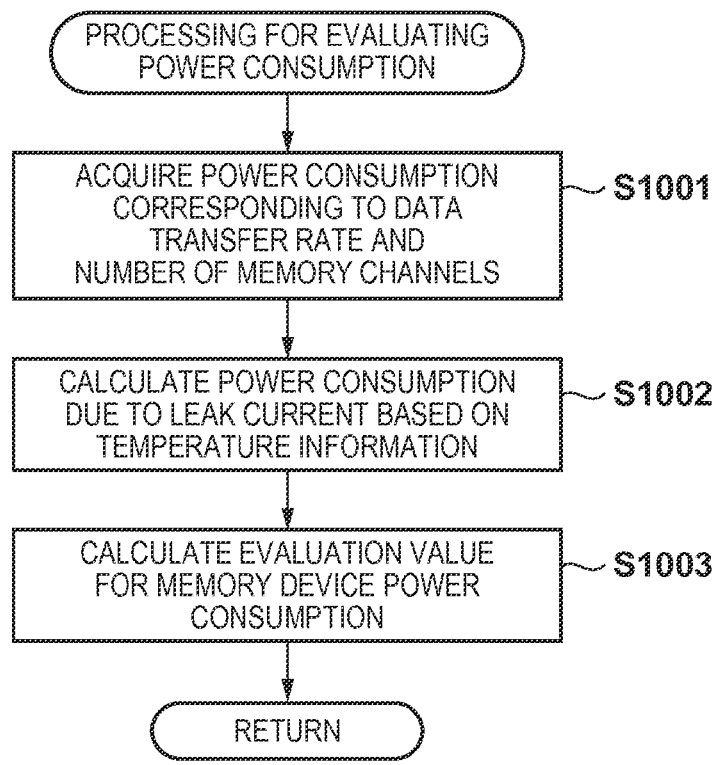
FIG. 9 is a diagram showing examples of temperature information acquired by the temperature sensors, according to an embodiment of the present invention.

When a temperature information acquisition request from the CPU 101 is input, the temperature information storage register 402 makes a request to the temperature acquisition I/F 315 to acquire the temperature information of the temperature sensor designated by the temperature sensor designation register 401. Also, the temperature information storage register 402 stores temperature information acquired from the temperature acquisition I/F 315, and outputs the temperature information stored therein in accordance with a temperature information readout request from the CPU 101. Here, FIG. 9 is a diagram showing an example of temperature information that indicates the temperature of the SDRAMs 301 to 304 acquired from the temperature sensors 309 to 312 in the present embodiment. FIG. 9 shows that the SDRAM 304, which corresponds to memory channel 4 and whose temperature was measured by the temperature sensor 312, has the highest temperature, while the SDRAM 301, which corresponds to memory channel 1 and whose temperature was measured by the temperature sensor 309, has the lowest temperature.

The memory controller operation mode setting registers 403 to 406 are registers for setting the operation modes of the memory controllers 305 to 308 respectively. The memory controller operation mode setting registers 403 to 406 respectively store setting values related to memory control for the SDRAMs 301 to 304. Here, examples of setting values related to memory control include time intervals of refresh operations for the SDRAMs 301 to 304, timing parameters related to memory access, and the like.

Figure 5:
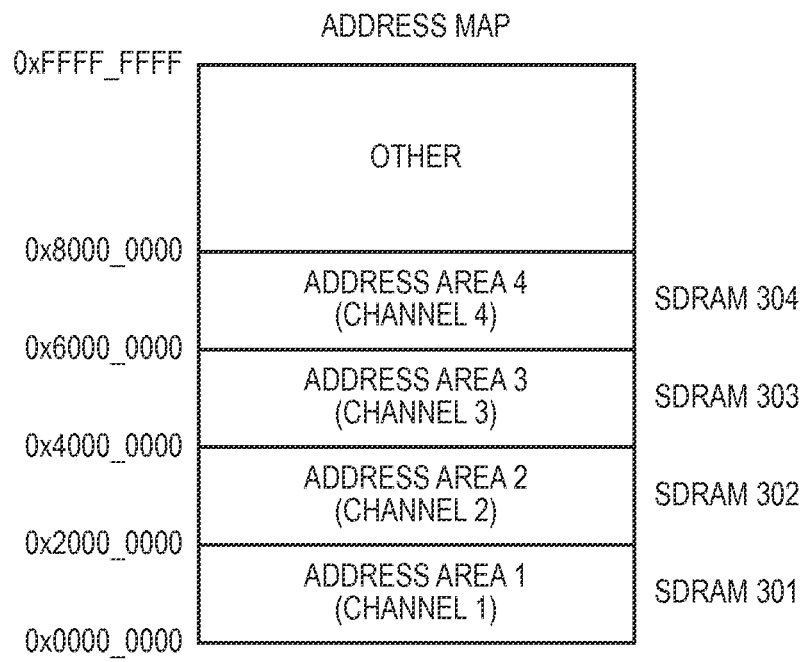
FIG. 5 is a diagram for describing an address map showing address areas allocated to an SDRAM according to an embodiment of the present invention.

FIG. 5 is a diagram for describing an address map indicating address areas allocated to the SDRAMs 301 to 304, according to the present embodiment.

In the present embodiment, an address area 1 is allocated to the SDRAM 301, an address area 2 is allocated to the SDRAM 302, an address area 3 is allocated to the SDRAM 303, and an address area 4 is allocated to the SDRAM 304. However, the sizes of the address areas are not limited to those illustrated in FIG. 5. Note that the aforementioned program of the CPU 101 is loaded to the address area 1 in the SDRAM 301.

<SoC Package 207 and Arrangement of Temperature Sensors 309 to 312>

Figure 6:
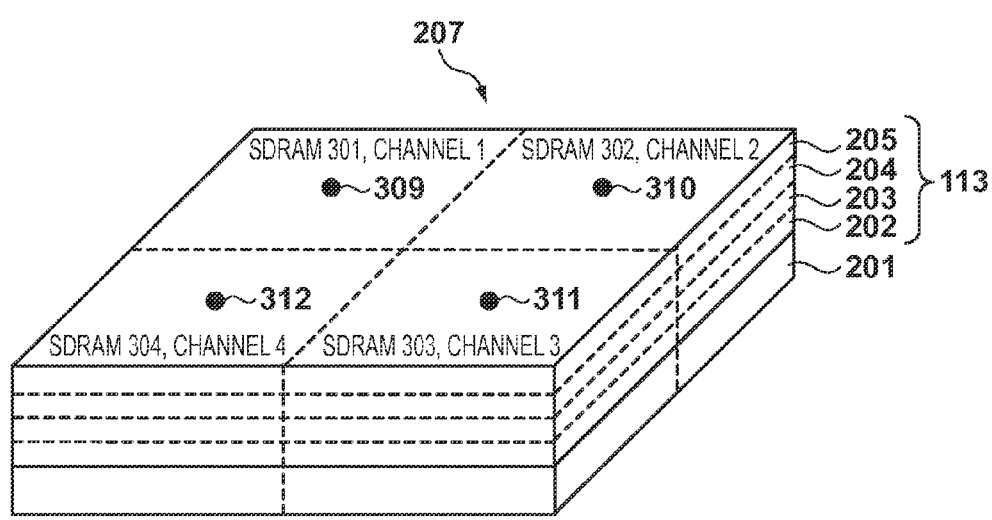
FIG. 6 is an overhead view of an SoC package according to an embodiment of the present invention.

FIG. 6 is an overhead view of the SoC package 207 for simplifying the description of the physical positional relationships of the wide IO SDRAM chips 202 to 205 and the SoC die 201 in FIG. 2.

The SoC die 201 includes the CPU 101, the device I/F 107, the RIP 111, the aforementioned image processing units 108 to 110, and the like. The channels (memory channels) 1 to 4 in FIG. 2B correspond to the upper left, upper right, bottom left, and bottom right portions of the plane of the SoC package 207. Also, the four portions similarly correspond to the SDRAMs 301 to 304 in FIG. 3. As described above, the wide IO SDRAM 113 is a memory stacked over the SoC die 201. Additionally, in the present embodiment, the devices in the SDRAMs 301 to 304 are stacked in four layers above the four portions of the SoC die 201, as shown in FIG. 6. The temperature sensors 309 to 312 are built into the devices in the SDRAMs 301 to 304 so that the internal temperature of each memory can be measured. However, this is merely an example, and the arrangement of the SDRAMs and the temperature sensors is not limited to FIG. 6. Also, the temperature sensors 309 to 312 may be provided within the SoC die 201, or they may be provided within the memory of the wide IO SDRAM 113.

<Processing for Acquiring Temperature Information>

Figure 7:
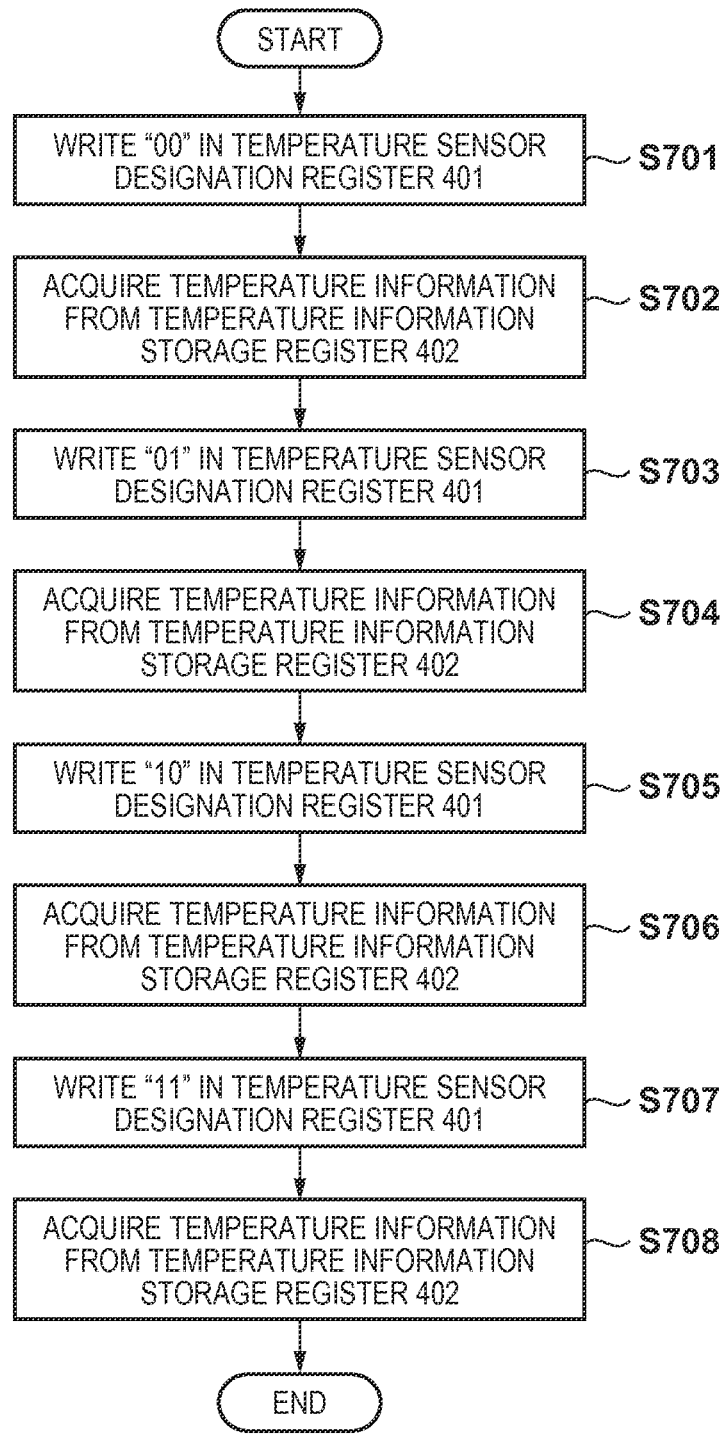
FIG. 7 is a flowchart showing a procedure of processing performed by a CPU to acquire temperature information indicating temperatures measured with temperature sensors in the MFP, according to an embodiment of the present invention.

FIG. 7 is a flowchart showing a procedure of processing performed by the CPU 101 to acquire temperature information indicating the temperatures of the SDRAMs 301 to 304 measured by the temperature sensors 309 to 312 in the MFP 100 according to the present embodiment. Since the MFP 100 includes four temperature sensors in the present embodiment, the flowchart in FIG. 7 shows processing for acquiring temperature information from the four temperature sensors 309 to 312. Note that the program for executing this processing is installed in advance on the HDD 105. This processing is realized in the MFP 100 by the CPU 101 loading the program from the HDD 105 to the SDRAM 301 and executing the loaded program.

First, in step S701, the CPU 101 writes "00" in the temperature sensor designation register 401. In the present embodiment, the SoC package 207 includes four temperature sensors. Because of this, the CPU 101 associates the temperature sensors with setting values in the temperature sensor designation register 401 in the following manner in order to designate the temperature sensors. That is to say, the values in the temperature sensor designation register 401, namely "00", "01", "10", and "11", are associated with the temperature sensors 309 to 312, respectively. Thus, in step S701, the CPU 101 writes "00" in the temperature sensor designation register 401 in order to designate the temperature sensor 309.

Next, moving to step S702, the CPU 101 issues a temperature information readout request to the temperature information storage register 402 and acquires temperature information indicating the temperature of the SDRAM 301, which was measured by the temperature sensor 309. Here, as described above, upon detecting the readout request from the CPU 101, the temperature information storage register 402 acquires temperature information from the temperature sensor designated by the temperature sensor designation register 401. Moreover, the temperature information storage register 402 outputs the acquired temperature information to the CPU 101 as response data in response to the readout request from the CPU 101. Thus, the CPU 101 acquires the temperature information from the temperature sensor 309 in step S702.

Next, moving to step S703, the CPU 101 writes "01" in the temperature sensor designation register 401 in order to acquire temperature information indicating the temperature of the SDRAM 302, which was measured by the temperature sensor 310. Subsequently, moving to step S704, the CPU 101 issues a temperature information readout request to the temperature information storage register 402 and acquires the temperature information from the temperature sensor 310.

Next, moving to step S705, the CPU 101 writes "10" in the temperature sensor designation register 401 in order to acquire temperature information indicating the temperature of the SDRAM 303, which was measured by the temperature sensor 311. Subsequently, moving to step S706, the CPU 101 issues a temperature information readout request to the temperature information storage register 402 and acquires the temperature information from the temperature sensor 311.

Next, moving to step S707, the CPU 101 writes "11" in the temperature sensor designation register 401 in order to acquire temperature information indicating the temperature of the SDRAM 304, which was measured by the temperature sensor 312. Subsequently, moving to step S708, the CPU 101 issues a temperature information readout request to the temperature information storage register 402 and acquires the temperature information from the temperature sensor 312.

According to the above-described processing, the CPU 101 can acquire temperature information indicating the temperatures of the SDRAMs 301 to 304, which were measured by the temperature sensors 309 to 312, from the temperature sensors 309 to 312.

<Control of Memory Channels of Wide IO Memory Device>

Figure 8:
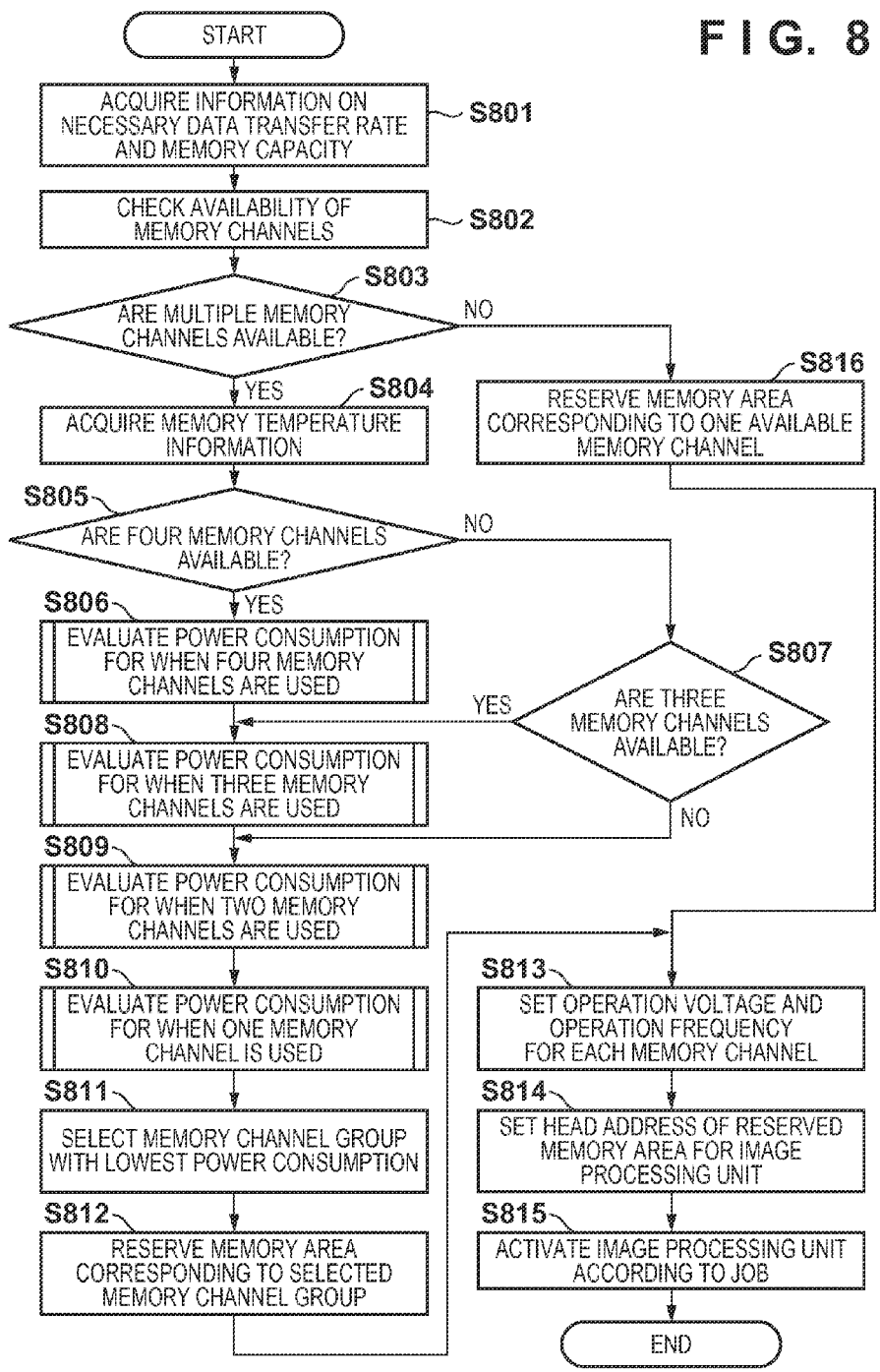
FIG. 8 is a flowchart showing a procedure of processing performed by the CPU to perform memory channel control and job execution when jobs such as printing and copying are to be executed in the MFP, according to an embodiment of the present invention.

The processing for realizing greater power conservation by reducing power consumption in a wide IO memory device without reducing the performance of access to the device is performed by the MFP 100 of the present embodiment in accordance with the procedure shown in the flowchart in FIG. 8. Note that as stated above, the wide IO SDRAM 113 (the SDRAMs 301 to 304) corresponds to the wide IO memory device.

In the present embodiment, the CPU 101 controls the number and the combination of memory channels used in the execution of jobs (functions), as well as the operation voltage (power supply voltage) and operation frequency (clock frequency) of SDRAMs corresponding to memory channels to be used. Specifically, for each group in multiple memory channel groups composed of a possible combination of available memory channels, the CPU 101 evaluates the power consumption of the wide IO memory device in the case of using the memory channels included in the memory channel group. At that time, the CPU 101 evaluates the power consumption of the wide IO memory device in the case of using the memory channel groups at the operation frequency and the operation voltage that correspond to the number of memory channels in the memory channel groups and the to transfer rate needed for job execution. Furthermore, as a result of evaluating the power consumption, the CPU 101 selects the memory channel group having the lowest power consumption (i.e., a combination of one or more memory channels), and uses the selected memory channel group for job execution. Greater power conservation in the wide IO memory device (the wide IO SDRAM 113) and the MFP 100 is achieved by reducing the power consumption of the wide IO memory device using this control.

FIG. 8 is a flowchart showing a procedure of processing performed by the CPU 101 to perform memory channel control and job execution when jobs such as copying or printing are to be executed in the MFP 100 according to the present embodiment. Upon receiving a job such as copying or printing via the operation unit 102 or the network I/F 103, the CPU 101 executes the processing in FIG. 8 before starting the execution of the job. Note that the program for executing this processing is installed in advance in the HDD 105. This processing is realized in the MFP 100 by the CPU 101 loading the program from the HDD 105 to the SDRAM 301 and executing the loaded program.

The data transfer rate needed for the image processing units 108 to 111 (functional modules) to execute their respective functions (image processing functions) is decided on in advance during the designing of the MFP 100. The necessary data transfer rate is decided on so as to satisfy a requirement regarding the system performance of the MFP 100, even in the case where there is competition in the execution of the functions of the image processing units 108 to 111. Also, the capacity of the memory areas needed for the execution of processing by the image processing units 108 to 111 is decided on in advance during the designing of the MFP 100 as well. The information on the data transfer rate and the memory capacity is stored in advance in the ROM 106 and read out and used by the CPU 101 as needed.

Upon receiving a job, the CPU 101 starts to execute the processing in FIG. 8. Below, a description will be given for an example of processing for when a print job is input to the MFP 100 and the CPU 101 causes the printing image processing unit 109 to execute predetermined image processing based on that print job. That is to say, the description below corresponds to the case where an instruction to execute the function of the printing image processing unit 109 (functional module) is given according to an input print job.

In step S801, the CPU 101 acquires the information on the memory capacity and the data transfer rate needed to execute processing in accordance with the job, based on the setting data of the input job. This information can be acquired each time a job is to be executed, by the CPU reading out the necessary information from the ROM 106, as described above.

Next, in step S802, the CPU 101 checks the status of use of the multiple memory channels 1 to 4 that correspond to the multiple memories (the SDRAMs 301 to 304) included in the wide IO memory device, at the point in time when the job is received (i.e., when the job execution request is received). Thus, the CPU 101 specifies one or more accessible (available) memory channels from among the memory channels 1 to 4. In the present embodiment, as an example, the CPU 101 executes the processing of step S802 by checking the information held by a memory manager that manages the status of memory use. The memory manager is software that runs on the CPU 101, and it manages the memory area reserved by the image processing unit using the memory device (the wide IO SDRAM 113). The CPU 101 checks whether or not any memory channels are unused (i.e., whether or not any memory channels are available) by referencing the information regarding the memory area reserved by the image formation units, which is held by the memory manager.

Next, in step S803, the CPU 101 determines whether or not multiple memory channels are available, based on the status of memory use that was checked in step S802. If the CPU 101 determines that multiple memory channels are available, the procedure moves to step S804, and if it determines that only one memory channel is available, the procedure moves to step S816.

In step S804, the CPU 101 acquires temperature information indicating the temperatures of the memories (SDRAMs 301 to 304), which are measured by the temperature sensors 309 to 312. Note that the acquisition of temperature information in step S804 is executed in accordance with the flowchart in FIG. 7, as described above. Here, it is assumed that the temperature information shown in FIG. 9 is acquired, for example. Note that in the case where the power consumption of the wide IO SDRAM 113 is evaluated without using the temperature information in the later-described steps S805 to S810, the CPU 101 does not need to execute the processing of step S804.

(Evaluation of Power Consumption)

After step S804, the CPU 101 executes the processing of steps S805 to S810. In steps S805 to S810, for each of multiple memory channel groups made up of a possible combination of available memory channels, the CPU 101 evaluates the power consumption of the wide IO SDRAM 113 in the case of using the memory channels included in the memory channel group. That is to say, for each combination of memory channels that can be formed according to the number of available memory channels, the CPU 101 evaluates the power consumption of the wide IO SDRAM 113 in the case of using the available memory channels. Moreover, in subsequent step S811, the CPU 101 selects a memory channel group to be actually used for job execution, based on the results of evaluating the power consumption corresponding to the memory channel groups.

The evaluation of the power consumption of the wide IO SDRAM 113 is realized by referencing a table, such as the one shown in FIG. 11 for example, that is stored in advance in the ROM 106. FIG. 11 is an example of a table that is stored in the ROM 106 and used in the evaluation of the power consumption of the wide IO SDRAM 113. This table includes information regarding the operation voltage and the operation frequency (clock frequency) of memories (the SDRAMs 301 to 304) corresponding to memory channels in correspondence with a data transfer rate and numbers of memory channels to be used. Note that the table shown in FIG. 11 corresponds to an example of a table used in the case where a print job is input and an instruction is given to execute the function of the printing image processing unit 109.

The operation frequency of the table shown in FIG. 11 is calculated in advance (during the designing of the MFP 100) such that the necessary data transfer rate is satisfied for each number of available memory channels. Also, the operation voltage is decided on in advance to be the lowest voltage among the operation voltages that can be set with respect to the calculated operation frequency in order to reduce power consumption. Moreover, the operation power (power consumption) corresponding to the operation frequency and the operation voltage decided on in this way is calculated in advance, and the calculated operation power is held in the table shown in FIG. 11 in association with the number of memory channels to be used, the operation frequency, and the operation voltage. Accordingly, the CPU 101 can acquire the power consumption corresponding to the number of available memory channels and the necessary data transfer rate, by referencing the table (FIG. 11) stored in the ROM 106.

Note that FIG. 11 shows a case where the power consumption of the wide IO SDRAM 113 depends on the data transfer rate and the number of memory channels to be used, but does not depend on the possible combinations of memory channels for the same number of memory channels. For example, if the number of memory channels to be used is three, there are six combination patterns for the three available memory channels out of the four memory channels, but the power consumption evaluation value is the same for each of those patterns.

However, as will be described later, if consideration is given to power consumption caused by leak current, which depends on the temperatures of the memories corresponding to memory channels (the SDRAMs 301 to 304), there is a possibility that the power consumption evaluation value will change depending on the combination of memory channels. By evaluating the power consumption of the wide IO SDRAM 113 in consideration of the temperatures of the memories, it is possible to obtain a more accurate power consumption evaluation value, and it is possible to realize the selection of memory channel groups with a higher degree of accuracy, and to realize greater power conservation. If consideration is thus given to the temperatures of the memories, the power consumption of the wide IO SDRAM 113 may be evaluated (calculated) using the processing described later with reference to FIG. 10 in steps S806, S808, S809, and S810.

Returning to FIG. 8, in step S805, the CPU 101 determines whether or not four memory channels are available, and if four memory channels are available, the procedure moves to step S806, otherwise the procedure moves to step S807. In step S806, the CPU 101 evaluates the power consumption of the wide IO SDRAM 113 in the case where four memory channels are used, as described above, and the procedure moves to step S808.

In step S807, the CPU 101 determines whether or not three memory channels are available, and if three memory channels are available, the procedure moves to step S808, otherwise the procedure moves to step S809. In step S808, for each possible combination of memory channels in the case where three memory channels are to be used, the CPU 101 evaluates the power consumption of the wide IO SDRAM 113 as described above, and the procedure moves to step S809.

In step S809, for each possible combination of memory channels in the case where two memory channels are to be used, the CPU 101 evaluates the power consumption of the wide IO SDRAM 113 as described above, and the procedure moves to step S810. In step S810, for each memory channel in the case where that one channel is to be used, the CPU 101 evaluates the power consumption of the wide IO SDRAM 113 as described above, and the procedure moves to step S811.

(Selection of Memory Channel Group)

In step S811, the CPU 101 selects a memory channel group to be used for job execution, based on the power consumption evaluation values obtained in steps S806, S808, S809, and S810. Specifically, the CPU 101 selects the memory channel group whose power consumption is the lowest out of the multiple memory channel groups whose power consumption was evaluated, as the memory channel group to be used for job execution. Note that it is also possible to select an appropriate memory channel group to suit the image processing unit by selecting the memory channel group whose power consumption is the lowest, and that has a number of memory channels that enables using the memory capacity needed by the image processing unit to be used in job execution.

(Reservation of Memory Area)

Next, in step S812, the CPU 101 reserves a memory area to be used for the job (i.e., by the printing image processing unit 109) in the memories (the SDRAMs 301 to 304) corresponding to the memory channels included in the memory channel group selected in step S811. Note that the CPU 101 may reserve a memory area having a memory capacity that is needed for execution of a process in accordance with a job, based on the information acquired in step S801. Subsequently, the CPU 101 moves the procedure to step S813.

On the other hand, if the procedure moves from step S803 to S816, in step S816, the CPU 101 reserves the memory area to be used for the job in the memory corresponding to that memory channel since only one memory channel is not in use. This corresponds to the case where memory channels are being used in processing performed for another job (another image processing unit), for example. The CPU 101 subsequently moves the procedure to step S813.

(Setting of Memory Operation Conditions)

In step S813, the CPU 101 controls the memories (SDRAMs 301 to 304) corresponding to the memory channels included in the memory channel group selected in step S811, such that they operate at the operation voltage and operation frequency that correspond to that memory channel group. Specifically, the CPU 101 acquires the operation voltage and the operation frequency to be set for the memory area, which was reserved in step S812 and is to be used in the processing according to the job, by referencing the table (FIG. 11) stored in the ROM 106. Moreover, the CPU 101 gives a command to the power supply voltage control unit 119 and the operation clock control unit 120 to cause the reserved memory area to operate at the acquired operation voltage and operation frequency. In this manner, the CPU 101 reduces the operation voltage and the operation frequency of the reserved memory area according to the necessary data transfer rate and the number of memory channels in the memory channel group selected in step S811. Thus, power consumption when using the wide IO SDRAM 113 is reduced as much as possible while performance of access to the wide IO SDRAM 113 is maintained.

Note that if the procedure moves from step S816 to step S813, the CPU 101 may issue a command to the power supply voltage control unit 119 and the operation clock control unit 120 to cause the reserved memory area to operate at the operation frequency and operation voltage in the case of using one memory channel (FIG. 11).

Next, in step S814, the CPU 101 sets a head address in the memory area reserved in step S812 or step S816 for the image processing unit (here, the printing image processing unit 109) that is to operate. By doing this, the CPU 101 makes it possible for that image processing unit to use the reserved memory area.

(Job Execution)

In step S815, the CPU 101 activates the image processing unit (here, the printing image processing unit 109) that is to execute the processing according to the job, and executes functions, such as image processing, which are needed for the job and designated by the job. Here, the activation of the image processing unit corresponds to the setting of a setting value of an enable register provided in the image processing unit to a value indicating an enabled state, for example.

Note that the following processing is an example of processing in which an image processing unit uses a memory area. The image processing unit executes various types of filter processing in smoothing processing and image area determination processing, for example. Normally, this filter processing requires a buffer for storing the number of lines of the raster-format input image data that corresponds to the filter window width. In view of this, in the present embodiment, a buffer for storing this number of lines of image data is realized by reserving a memory area in the wide IO SDRAM 113, and filter processing is executed using the reserved memory area.

The image processing unit thus executes the processing according to the job using a memory area reserved in the wide IO SDRAM 113. When this processing ends, the CPU 101 releases the memory area that was reserved for the job. Moreover, the CPU 101 returns the operation frequency and operation voltage of the memory area to their respective states before the memory area was reserved (i.e., before the execution of the processing according to the job started). That is to say, the operation state of the memory area is returned to its original state, as will be described later. For example, reduction of power consumption is enabled by causing the memory area to operate in the self-refresh mode, or the like.

<Processing for Evaluating Power Consumption Using Temperature Information>

FIG. 10 is a flowchart showing a procedure of evaluation processing in the case where power consumption is to be evaluated using the temperature information of the memories in steps S806, S808, S809, and S810 (FIG. 8). The processing in FIG. 10 may, in particular, be used if the power consumption of the wide IO SDRAM 113 is to be evaluated giving consideration to power consumption caused by leak current that depends on the temperature of memories corresponding to the memory channels. Here, the CPU 101 evaluates the power consumption of the wide IO SDRAM 113 based on the temperature information of multiple memories, which is acquired by the temperature sensors 309 to 312, in addition to the power consumption acquired in the above-described manner using the table in FIG. 11.

Upon starting the processing in step S806, S808, 3809, or S810, the CPU 101 moves the procedure to step S1001. First, in step S1001, the CPU 101, using the table (FIG. 11) stored in the ROM 106, acquires the power consumption in the case where the memory channel group that is the evaluation target is used at the operation voltage and operation frequency that correspond to the necessary data transfer rate and number of memory channels to be used.

Next, in step S1002, the CPU 101 calculates the power consumption (power leakage) caused by leak current that is generated in the memories and that corresponds to the temperature indicated by the temperature information of the memories corresponding to the memory channel group of the evaluation target, based on the temperature information acquired in step S804. For example, it is possible to measure leak current values that correspond to memory temperatures in advance, and obtain the leak current value based on those measurement values.

Figure 12:
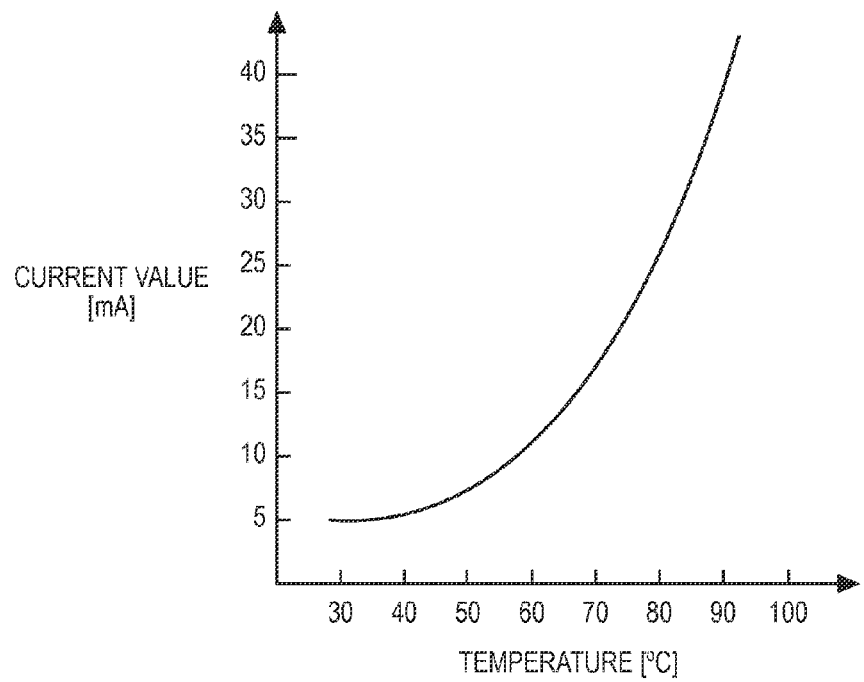
FIG. 12 is a diagram showing an example of leak current values that correspond to SDRAM temperatures, according to an embodiment of the present invention.

FIG. 12 is a diagram showing an example of leak current values that were measured in advance and correspond to the temperatures of a memory (SDRAMs 301 to 304). By storing information indicating the correspondence relationship between the temperatures and the leak current values, such as that shown in FIG. 12, in the ROM 106 in advance, it is possible for the CPU 101 to obtain a leak current value corresponding to the temperature indicated by the temperature information, using the information stored in the ROM 106. The CPU 101 can furthermore calculate the power leakage by multiplying the obtained leak current value by the operation voltage obtained in step S1001 from the table (FIG. 11) stored in the ROM 106.

Lastly, in step S1003, the CPU 101 calculates the power consumption of the wide IO SDRAM 113 in the case where the memory channel group of the evaluation target is used, by adding the power consumption calculated in step S1002 (power leakage) to the power consumption acquired in step S1001. According to the above-described process, the CPU 101 ends the processing for evaluating the power consumption of the wide IO SDRAM 113 in step S806, S808, S809, or step S810 (FIG. 8).

<Operation States of the Wide IO SDRAM 113>

Figure 13:
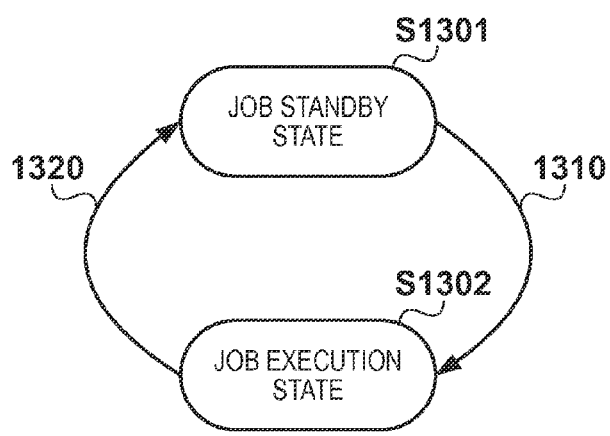
FIG. 13 is a state transition diagram showing an example of transition in the operation state of the wide IO memory device according to an embodiment of the present invention.

FIG. 13 is a state transition diagram showing an example of transition in the operation state of the wide IO memory device (the wide IO SDRAM 113), according to the present embodiment.

S1301 corresponds to an operation state of the wide IO SDRAM 113 (job standby state) when the MFP 100 is waiting for some type of job to be input, or in other words, it corresponds to a state before the execution of the processing in FIG. 8 is started. At this time, there are no jobs being executed in the MFP 100. In addition, only the memory having the area reserved as the system memory (the SDRAM 301) and the corresponding memory channel 1 are in an ON state in the wide IO SDRAM 113. On the other hand, the remaining three memory channels 2 to 4 and the corresponding memories (the SDRAMs 302 to 304) are in a state of operating in a power-saving mode, such as the self-refresh mode. Due to this, the power consumption of the wide IO SDRAM 113 is reduced to be less than that of the job execution state (S1302).

The CPU 101 may set the operation frequency and operation voltage of the memory in the ON state to the values used during normal operations (e.g., 260 MHz and 1.5 V). Alternatively, the CPU 101 may set this operation frequency and operation voltage to values that are as low as possible (hereinafter referred to as "initial setting values"), within a range where the system memory can maintain the necessary data transfer rate. Thus, the power consumption of the wide IO SDRAM 113 in the job standby state can be further reduced.

When a job (e.g., a print job) is input to the MFP 100 in the state S1301, the CPU 101 executes a series of processes in accordance with the procedure shown in FIG. 8. When the series of processes is complete, the operation state of the wide IO SDRAM 113 transitions from S1301 to S1302 (1310).

S1302 corresponds to an operation state of the wide IO SDRAM 113 during the execution of the input job by the MFP 100 (job execution state). That is to say, S1302 corresponds to a state in which a job is executed after the memory channel group to be used (the number of memory channels to be used), the operation frequency, and the operation voltage, which were decided on by the series of processes in accordance with the procedure shown in FIG. 8, are applied to the wide IO SDRAM 113. At this time, no competing operations of the image processing units 108 to 111 are executed, and the memories corresponding to the memory channels that are to not be used as a result of the selection in step S811 may be in a state of operating in the aforementioned power-saving mode. Alternatively, the operation frequency and operation voltage of the memories corresponding to those memory channels may be set to the aforementioned initial setting values.

When all of the operations (processes), including those in competition, are complete, the operation state of the wide IO SDRAM 113 returns once again to S1301 (1320). At this time, the CPU 101 sets the operation frequency and the operation voltage of the memory being used as the system memory (the SDRAM 301) to the initial setting values, whereas it sets the remaining three memories (the SDRAMs 302 to 304) to the power-saving mode.

As described above, the MFP 100 of the present embodiment selects a memory channel group, which has a number of memory channels capable of maintaining the necessary data transfer rate even if the operation frequency is reduced, out of the memory channel groups composed of possible combinations of available memory channels. That is to say, even if the operation frequency is lowered, the total memory bandwidth being used is maintained by increasing the number of memory channels being used. Thus, it is possible to lower the operation frequency while maintaining the data transfer rate needed for job execution.

Additionally, the MFP 100 evaluates the power consumption of the wide IO memory device in the case where memory channel groups are used at an operation voltage and operation frequency corresponding to the number of memory channels in the memory channel groups and to the transfer rate needed for job execution. As a result of the power consumption evaluation, the MFP 100 selects the memory channel group with the lowest power consumption and uses it for job execution. That is to say, the MFP 100 selects and uses the combination having the lowest power consumption in the wide IO memory device, out of the combinations of available memory channels, in the case of applying the operation voltage and the operation frequency that can be set according to the number of memory channels and the data transfer rate. At this time, power consumption can be further reduced by setting the operation voltage of the wide IO memory device to be as low as possible. Thus, it is possible to cause the wide IO memory device to operate at a low level of power consumption, while maintaining the access performance of the wide IO memory device. That is to say, the operation frequency of the wide IO memory device can be lowered without causing the access performance of that memory device to deteriorate, and it is possible to cause that memory device to operate with minimal power consumption.

Also, it is possible to obtain a highly accurate power consumption evaluation value for power consumption, by evaluating the power consumption of the wide IO SDRAM 113 with consideration given to the power consumption caused by leak current that depends on the temperature of memories corresponding to memory channels in the wide IO memory device. In this way, it is possible to achieve a higher degree of accuracy in memory channel group selection and to achieve greater power reduction.

Other Embodiments

Various variations of the aforementioned embodiments are possible. For example, when evaluating the power consumption of the wide IO SDRAM 113 in steps S805 to S810, it is possible to exclude memory channel groups that include memory channels corresponding to memories with relatively high temperatures (e.g., temperatures higher than a predetermined temperature) from the targets of power consumption evaluation. That is to say, such memory channels may be excluded from the one or more available memory channels, which are specified in step S802. In this way, the number of memory channel combinations (memory channel groups) that are to undergo power consumption evaluation can be reduced in advance, and thus the computational cost required in the power consumption evaluation processing can be reduced.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-221601, filed Oct. 3, 2012 which is hereby incorporated by reference herein in its entirety.

What is claimed is:

1. An information processing apparatus comprising:
   a wide IO memory device stacked over an SoC die that includes a CPU;
   a plurality of functional modules configured to each execute a separate function;
   a specifying unit configured to, upon being instructed to execute a function, specify one or more available memory channels based on a status of use of a plurality of memory channels corresponding to a plurality of memories included in the wide IO memory device;
   an evaluation unit configured to, for each of a plurality of memory channel groups composed of possible combinations of the memory channels specified by the specifying unit, evaluate power consumption of the wide IO memory device in a case where the memory channel group is used at an operation voltage and an operation frequency that correspond to a number of memory channels in the memory channel group and a data transfer rate needed for execution of the function; and a selection unit configured to select, out of the plurality of memory channel groups, a memory channel group for which power consumption of the wide IO memory device is lowest, as a memory channel group to be used by the functional module corresponding to the function.

2. The information processing apparatus according to claim 1, further comprising
a temperature acquisition unit configured to acquire temperature information indicating temperatures of the plurality of memories, wherein
for each of the plurality of memory channel groups, the evaluation unit evaluates power consumption of the wide IO memory device in the case where the memory channel group is used, additionally based on the temperature information regarding the plurality of memories acquired by the temperature acquisition unit.

3. The information processing apparatus according to claim 2, wherein
for each of the plurality of memory channel groups, the evaluation unit evaluates power consumption of the wide IO memory device in the case where the memory channel group is used, by calculating power consumption due to leak current that occurs in the plurality of memories and corresponds to temperatures indicated by the temperature information of the plurality of memories that is acquired by the temperature acquisition unit, and adding the calculated power consumption to power consumption according to the operation voltage and the operation frequency that correspond to the number of memory channels and the data transfer rate.

4. The information processing apparatus according to claim 2, wherein
the specification unit excludes a memory channel corresponding to a memory whose temperature indicated by the temperature information acquired by the temperature acquisition unit is greater than a predetermined temperature from the one or more available memory channels.

5. The information processing apparatus according to claim 1, wherein
the selection unit selects, out of the plurality of memory channel groups, a memory channel group that has the number of memory channels that enables use of a memory capacity required by the functional module corresponding to the function, and that has the lowest power consumption in the wide IO memory device, as the memory channel group to be used by the functional module corresponding to the function.

6. The information processing apparatus according to claim 1, further comprising
a control unit configured to control a memory corresponding to each memory channel included in the memory channel group selected by the selection unit, such that when processing is to be executed by the functional module, the memory operates at the operation voltage and the operation frequency corresponding to the selected memory channel group.

7. The information processing apparatus according to claim 6, wherein
the control unit reduces the operation voltage and the operation frequency of the memory corresponding to each memory channel included in the memory channel group selected by the selection unit, according to the number of memory channels in the selected memory channel group and the data transfer rate needed for execution of the function.

8. The information processing apparatus according to claim 6, wherein
the control unit reserves a memory area for use by the functional module, in the memory corresponding to each memory channel included in the memory channel group selected by the selection unit, and upon completion of processing by the functional module, releases the memory area.

9. The information processing apparatus according to claim 8, wherein
when the memory area to be used by the functional module has been reserved, the control unit enables the functional module to use the memory area by setting a head address of the memory area with respect to the functional module.

10. The information processing apparatus according to claim 6, wherein
upon completion of processing by the function module, the control unit returns the operation voltage and the operation frequency of each memory used in the processing executed by the functional module to a state before execution of the processing by the functional module started.

11. The information processing apparatus according to claim 1, wherein
the execution of the function is instructed by a job that is input, and
the data transfer rate is a data transfer rate required for the functional module to execute processing in accordance with the input job.

12. A control method for an information processing apparatus including a wide IO memory device stacked over an SoC die that includes a CPU, the control method comprising steps of:
upon instruction of execution of a function by a functional module out of a plurality of functional modules that each execute a separate function, specifying one or more available memory channels based on a status of use of a plurality of memory channels corresponding to a plurality of memories included in the wide IO memory device;
for each of a plurality of memory channel groups composed of possible combinations of the memory channels specified by the specifying unit, evaluating power consumption of the wide IO memory device in a case where the memory channel group is used at an operation voltage and an operation frequency that correspond to a number of memory channels in the memory channel group and a data transfer rate needed for execution of the function; and
selecting, out of the plurality of memory channel groups, a memory channel group for which power consumption of the wide IO memory device is lowest, as a memory channel group to be used by the functional module corresponding to the function.

13. A computer-readable storage medium storing a computer program for causing a computer to execute steps of a control method for an information processing apparatus including a wide IO memory device stacked over an SoC die that includes a CPU, the control method comprising steps of:
upon instruction of execution of a function by a functional module out of a plurality of functional modules that each execute a separate function, specifying one or more available memory channels based on a status of use of a plurality of memory channels corresponding to a plurality of memories included in the wide IO memory device;

for each of a plurality of memory channel groups composed of possible combinations of the memory channels specified by the specifying unit, evaluating power consumption of the wide IO memory device in a case where the memory channel group is used at an operation voltage and an operation frequency that correspond to a number of memory channels in the memory channel group and a data transfer rate needed for execution of the function; and selecting, out of the plurality of memory channel groups, a memory channel group for which power consumption of the wide IO memory device is lowest, as a memory channel group to be used by the functional module corresponding to the function.

* * * * *